(12) United States Patent
Taylor

(10) Patent No.: US 7,328,180 B1
(45) Date of Patent: Feb. 5, 2008

(54) RESOURCE ALLOCATION SYSTEM

(76) Inventor: Donald O. Taylor, 7611 Cherokee Springs Way, Knoxville, TN (US) 37919

( * ) Notice: Subject to any disclaimer, the term of this patent is extended or adjusted under 35 U.S.C. 154(b) by 1338 days.

(21) Appl. No.: 10/226,769

(22) Filed: Aug. 23, 2002

(51) Int. Cl.
G06Q 40/00 (2006.01)

(52) U.S. Cl. .......................................... 705/35; 705/36

(58) Field of Classification Search ................. 705/35, 705/36
See application file for complete search history.

(56) References Cited

U.S. PATENT DOCUMENTS

| | | | | |
|---|---|---|---|---|
| 5,774,881 | A | * | 6/1998 | Friend et al. ............. 705/36 R |
| 5,978,778 | A | * | 11/1999 | O'Shaughnessy ......... 705/36 R |
| 6,154,732 | A | * | 11/2000 | Tarbox ..................... 705/36 R |
| 2002/0002520 | A1 | * | 1/2002 | Gatto .......................... 705/36 |
| 2002/0062272 | A1 | * | 5/2002 | Kim et al . ................... 705/36 |

OTHER PUBLICATIONS http://web.archive.org/web/*/http://www.dodgeandcox.com/performance/index.shtml; dated May 6, 2001.*

Stocksystem.com Launches latest version of their popular buy low-sell high stock trading software, Business Wire, Jun. 9, 2001 Market Report: Logica plunges on talk of rights issue to buy BT arm, The Independent, May 30, 2001 Where to put your money; What the Fund Tables Say; How to buy funds, Far Eastern Economic Review, Apr. 1, 1993; 156, 13.*

Stocks end day higher; Chicago Sun Times, Aug. 16, 2001.*

India: Are markets headed for correction?, Businessline, Nov. 26, 2001.*

* cited by examiner

Primary Examiner—James A. Kramer
Assistant Examiner—Rajesh Khattar
(74) Attorney, Agent, or Firm—Luedeka, Neely & Graham, PC

(57) ABSTRACT

A method for ranking and allocating investment assets, the method including the steps of (a) classifying assets into discrete asset classes and obtaining index values for each of the asset classes; (b) determining a performance value for each of the asset classes based on the index values for a starting time period and at least three subsequent time periods for each asset class; (c) comparing the performance value of each asset class to one another and ranking the asset classes based on their performance values; and (d) allocating the investment assets among the asset classes based on the ranking of the asset classes.

7 Claims, 5 Drawing Sheets

| Asset Group | Performance Value | Rank | Allocation |
|---|---|---|---|
| Money Market | 3.27 % | 6 | 5 % |
| Small Cap Funds | 18.50 % | 1 | 30% |
| Mid Cap Funds | 17.20 % | 2 | 25 % |
| Foreign Equity Funds | 4.51 % | 5 | 5 % |
| Large Cap Growth Funds | 12.17 % | 3 | 20 % |
| Large Cap Value Funds | 7.82 % | 4 | 15 % |
| Intermediate Corp Funds | 3.83 % | - | 0 % |
| Long Term Corp Funds | 3.62 % | - | 0 % |
| High Yield Corp Funds | 1.91 % | - | 0 % |
| Long Term Gov Funds | 1.40 % | - | 0 % |

FIG. 3

OVERSOLD CONDITIONS

| Asset Group | Performance Value | Rank | Allocation |
|---|---|---|---|
| Money Market | 3.27 % | 6 | 5 % |
| Small Cap Funds | -5.89 % | 5 | 5% |
| Mid Cap Funds | -10.21 % | 3 | 20 % |
| Foreign Equity Funds | -16.26 % | 2 | 25 % |
| Large Cap Growth Funds | -25.40 % | 1 | 30 % |
| Large Cap Value Funds | -8.41 % | 4 | 15 % |
| Intermediate Corp Funds | 6.70 % | - | 0 % |
| Long Term Corp Funds | 8.88 % | - | 0 % |
| High Yield Corp Funds | 8.90 % | - | 0 % |
| Long Term Gov Funds | 5.38 % | - | 0 % |

FIG. 4

OVERBOUGHT CONDITIONS

| Asset Group | Performance Value | Rank | Allocation |
|---|---|---|---|
| Money Market | 3.27 % | 4 | 25 % |
| Small Cap Funds | 24.33 % | - | 0% |
| Mid Cap Funds | 23.71 % | - | 0 % |
| Foreign Equity Funds | 6.27 % | - | 0 % |
| Large Cap Growth Funds | 21.48 % | - | 0 % |
| Large Cap Value Funds | 6.75 % | - | 0 % |
| Intermediate Corp Funds | 3.87 % | 1 | 30 % |
| Long Term Corp Funds | 3.97 % | 2 | 25 % |
| High Yield Corp Funds | -2.02 % | - | 0 % |
| Long Term Gov Funds | 4.04 % | 3 | 20 % |

FIG. 5

RESOURCE ALLOCATION SYSTEM

FIELD OF THE INVENTION

This invention relates generally to resource allocation. More particularly, this invention relates to a system for evaluating investment options and allocating financial resources among selected investment options.

BACKGROUND AND SUMMARY OF THE INVENTION

Stocks, bonds, and stock, bond, and money market mutual funds are popular investment options. These are generally classified into various asset classes and indexes. Examples of asset classes and indexes are the S&P 500, Dow Jones Industrial, Nasdaq Composite, and indexes composed of small, mid, and large cap, global and various types of bond assets. Institutional investors such as those managing 401(k) portfolios often allocate portfolio assets among selected indexes and classes of stocks and bonds, most commonly stock, bond, and money market mutual funds, to enhance investment yields and reduce investment risks.

The invention advantageously provides a system that is useful for comparing the performance of various investment options to provide a mathematical basis for allocating resources among the available investment options.

In a preferred embodiment, the invention relates to methods and computer programs for ranking and allocating investment assets. The assets are classified into discrete asset classes and index values are obtained for each of the asset classes. A performance value is determined for each of the asset classes based on the index values for a starting time period and at least three subsequent time periods for each asset class. In a particularly preferred embodiment, the performance values are calculated based on the 5 and 12 week index value totals for an asset class in conjunction with the index value for the $14^{th}$ week.

The performance value of each asset class are then compared to one another and the asset classes are ranked based on their performance values. The investment assets may then be allocated among the asset classes based on the ranking of the asset classes. In a preferred embodiment, 5% of the assets are maintained in a Money Market Fund, and the remaining 95% of the assets are allocated so that the number 1 ranked asset class receives 30%, the second ranked asset class receives 25%, the third ranked asset class receives 20%, the fourth ranked asset class receives 15%, and the fifth ranked asset class receives 5% of the investment assets. The ranking and/or the allocation may preferably be modified for special conditions, such as in conditions corresponding to overbought or oversold conditions. The allocations are preferably re-evaluated on a periodic basis, most preferably about every six weeks.

BRIEF DESCRIPTION OF THE DRAWINGS

Further features of preferred embodiments of the invention will become apparent by reference to the detailed description of preferred embodiments when considered in conjunction with the figures, which are not to scale, wherein like reference numbers, indicate like elements through the several views, and wherein.

FIGS. 3-5, show examples of outputs achieved using the system and method of the invention to rank classes of assets.

DETAILED DESCRIPTION

The invention relates to a system for allocating resources. In a preferred embodiment, the system is a computer-based system that provides recommendations for diversified investment asset allocation based on asset class market trends. The system preferably updates allocations associated with a portfolio of assets on a periodic basis, preferably every six weeks, to yield enhanced investment yields.

For example, in a particularly preferred embodiment, the system facilitates selection and ranking of investment options having a positive trend so that assets may be desirably allocated among the selected investment options. The system is particularly useful for managing 401(k) and other tax qualified investment portfolios using indexes of common asset classes.

Figure 1:
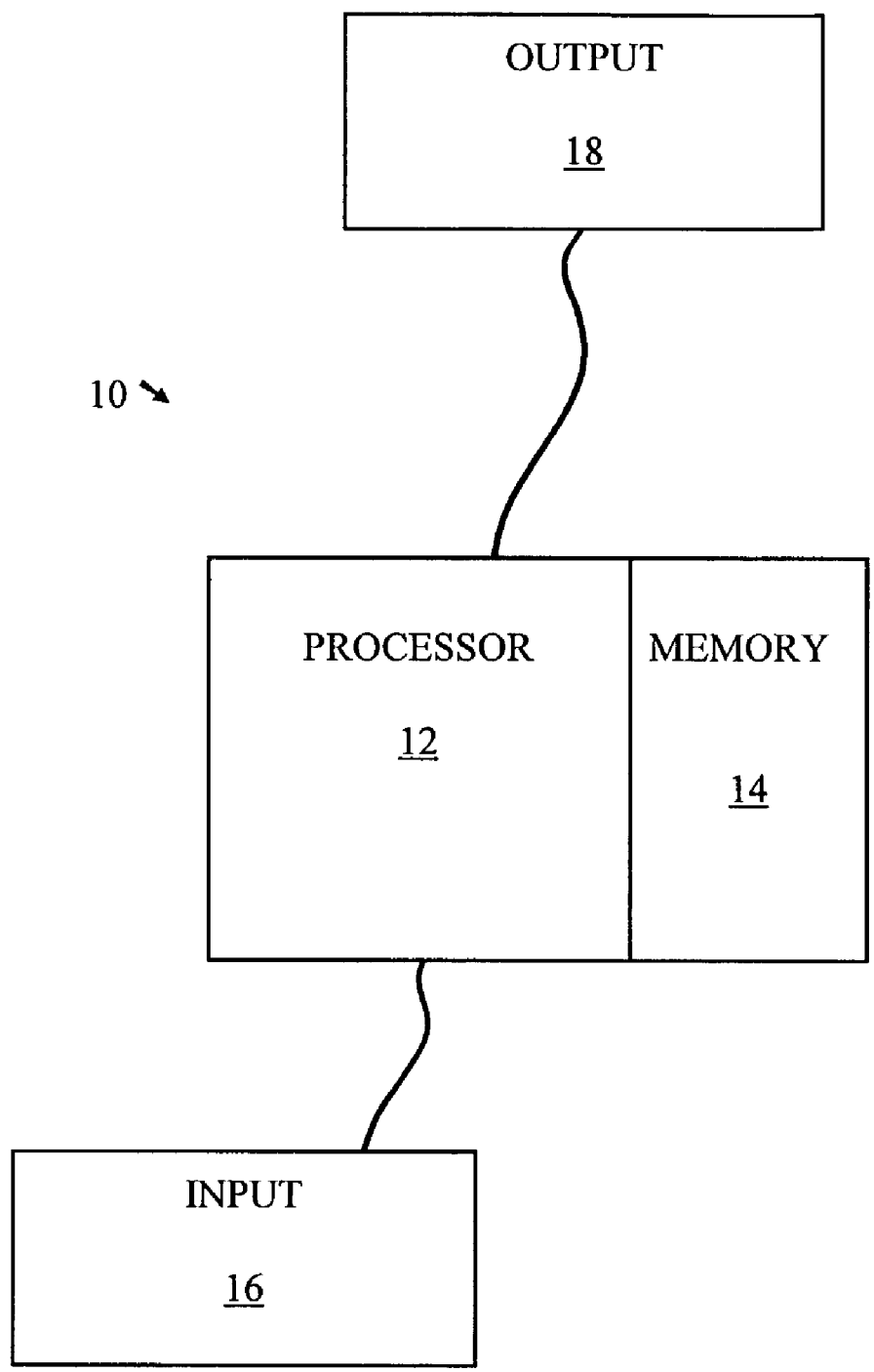
FIG. 1 is a block diagram of a computer system in accordance with a preferred embodiment.

With reference to FIG. 1, there is shown a system 10 in accordance with the invention. The system 10 preferably includes a computer-based processor 12 having memory 14. The processor 12 is in electrical communication with an input 16, such as a keyboard and mouse, and an output 18, such as a monitor or other display.

The system 10 is used to determine performance values for the investment options. The performance values are then used to make decisions as to how to allocate investment resources amongst the investment options. In this regard, the system 10 is particularly suitable for facilitating allocation by professional managers of assets of the type typical to 401(k) investments. Typical 401(k) assets commonly include various stock and bond mutual funds including a cash or money market option.

The memory 14 of the system 10 preferably stores desired information relating to the investment options as well as software for evaluating the investment options in accordance with a preferred method of the invention. In a preferred embodiment, the software associated with the system 10 is configured to perform desired calculations based on published index values available for classes of the assets and storable in the memory 14.

An index is typically made up of representative stocks or funds or bonds of an asset class, picked to represent the universe of the class. An "index value" is a value calculated for an index over a given time period, and typically daily. These calculations may be based or "weighted" on price, capitalization, or other basis.

Index values are generally published on a daily basis for a number of well-recognized asset classes. Examples of common asset classes include the S&P 500 (Standard & Poor), Dow Jones Industrial Average, Nasdaq Composite, Russell 2000, Wilshire 5000, Lehman Brothers Aggregate Bond Index, short term bonds, long term bonds, large cap growth stocks, large cap value stocks, mid cap growth stocks, mid cap value stocks, small cap growth stocks, small cap value stocks, foreign stocks, foreign bonds, and emerging markets.

In the context of the assets most common to 401(k) plans, e.g., mutual funds, index values are generally available on a daily basis for asset classes including Money Market Funds, Small Cap Funds (Russell 2000), Mid Cap Funds (MidCap Index), Foreign Equity Funds (International Market Index), Large Cap Growth Funds (S&P Barra Growth Index), Large Cap Value Funds (S&P Barra Value Index), Intermediate Corporate Funds (Merrill Lynch Total Return Corp 1-10 yr. Bond Index), Long Term Corporate Funds (Merrill Lynch Total Return Corp 10 yr.+Bond Index) High Yield Corporate Funds (Merrill Lynch High Yield Master Bond Index), and Long term Government Bond Funds (Merrill Lynch Treasury Master Bond Index). The foregoing classes are hereinafter collectively referred to as "401(k) Funds."

Figure 2:
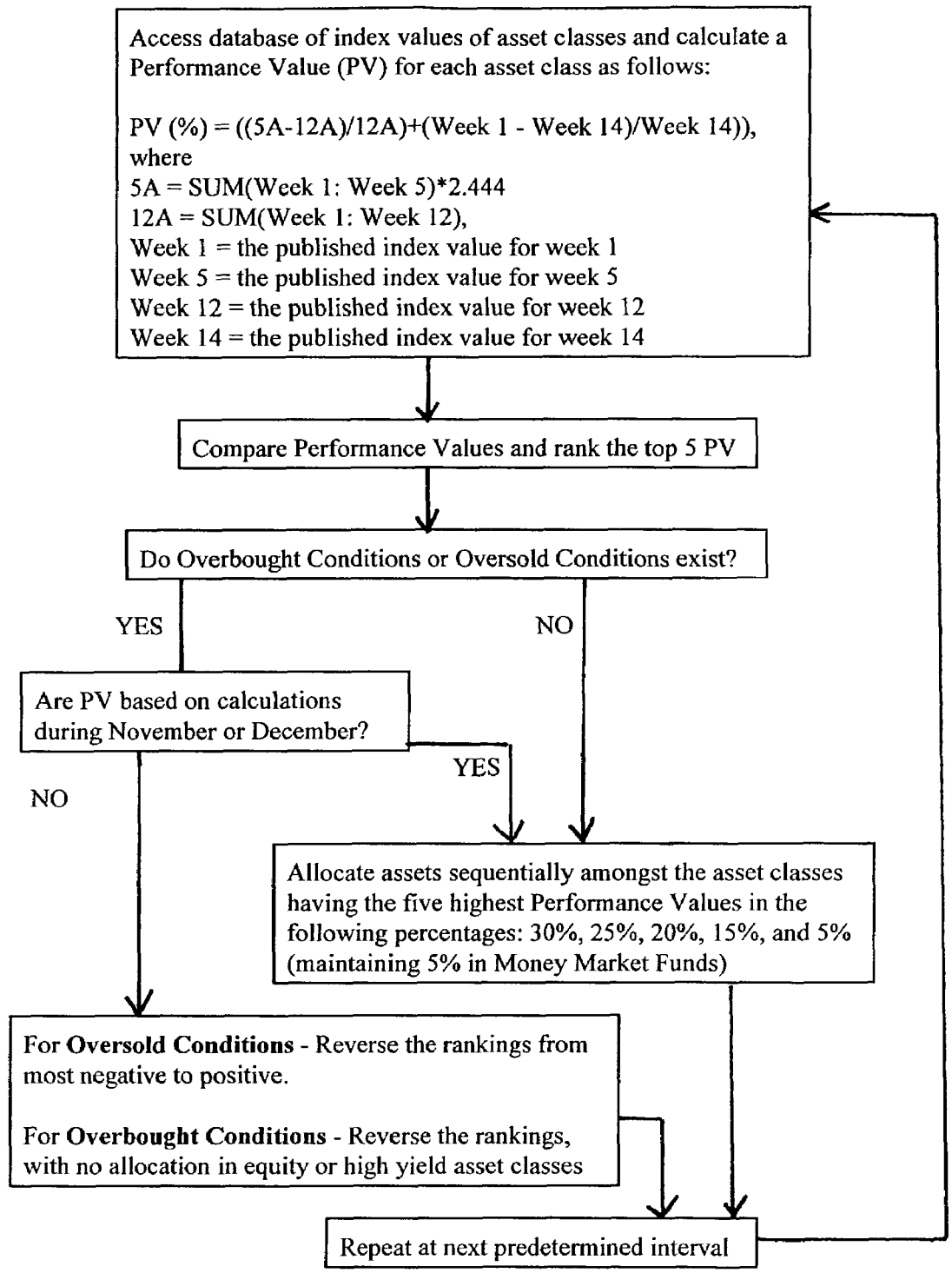
FIG. 2 is a flow chart for allocating investment assets in accordance with a preferred embodiment of the invention.

With reference to FIG. 2 there is shown a flow chart of steps in the allocation of assets in accordance with preferred aspects of the invention. In this regard, assets are preferably allocated based on calculations performed to yield a Performance Value (PV) for each asset class. Each Performance Value is preferably obtained by using a calculation based on the index values for various time periods for a desired asset class. The preferred calculation is based on the index values for a starting time period (Ts), and three subsequent time periods defined as a first time period (T1), a second time period (T2), and a third time period (T3), according to the following:

$$PV(\%) = ((A-B)/B) + (Vs-V3)/V3)), \text{ where}$$

A=SUM(Vs:V1)*2.444
B=SUM(Vs:V2), and
Vs=the published index value for the starting time period (Ts)
V1=the published index value for the first time period (T1)
V2=the published index value for the second time period (T2)
V3=the published index value for the third time period (T3)

In a particularly preferred embodiment, the preferred asset classes are the 401(k) Funds and the time periods are selected to be the 5, 12, and $14^{th}$ week time periods and the calculation is based on the 5 and 12 week index value totals for an asset class in conjunction with the index value for the $14^{th}$ week, according to the following:

$$PV(\%) = ((5A-12A)/12A) + (\text{Week 1-Week 14})/\text{Week 14})), \text{ where}$$

5A=SUM(Week 1:Week 5)*2.444
12A=SUM(Week 1:Week 12), and
Week 1=the published index value for week 1
Week 5=the published index value for week 5
Week 12=the published index value for week 12
Week 14=the published index value for week 14

The Performance Values for each asset class are then compared to one another and an allocation of investment assets is made amongst the asset classes based on the compared Performance Values. In a preferred embodiment, the assets are allocated sequentially amongst the asset classes having the five highest Performance Values in the following percentages: 30%, 25%, 20%, 15%, and 5%. An amount corresponding to 5 percent of the investment assets is preferably maintained in the Money Market Fund asset class.

It will be appreciated that different allocations may be made based upon the rankings depending upon particular market conditions and individual investor needs and preferences. For example, a particularly conservative investor may desire a higher percentage in Money Market Fund assets, whereas a particularly aggressive investor may desire less in Money Market Funds and more in more aggressive funds. The rankings of the asset classes may thus be used to allocate the assets in other percentages.

In a preferred embodiment, special market conditions, particularly with regard to equity groups, (e.g., such as the Foreign Equities, Large Cap Growth, and the like, trigger a different ranking and/or allocation of assets. For example, in a particularly preferred embodiment, if the calculations for the Performance Value registers negative 15 percent (−15%) or less in the top equity group and the majority of all equity groups are negative, the rankings are preferably reversed from the most negative to the positive (while maintaining 5% in Money Market Fund). This condition is considered to represent an Oversold Condition.

It is preferred in an Oversold Condition to allocate the asset resources more heavily into a depressed asset class to take advantage of a potential bounce back or increase of the value of the asset class. However, due to tax selling, it is preferred not to use an Oversold Condition allocation for calculations made during the months of November and December. Also, as will be recognized, different allocation percentages may be selected based on the rankings.

Another special condition is preferably determined to exist if the Performance Value of the top equity asset class registers over twenty percent (20%) and the majority of the equity asset classes are positive. This condition is considered to represent an Overbought Condition, and it is preferred to sell into extremely optimistic asset classes to preserve capital.

In an Overbought Condition, no allocations are made to high yield bonds or equity groups, and the excess balance is allocated to the Money market Fund. In addition, if the Performance Value of any equity group registers over 25%, the rankings are reversed from the most positive to the most negative.

The Overbought Condition, like the Oversold Condition, is likewise preferably not used in November and December since equities with overbought conditions may remain in this condition thru the tax selling period. Also, as will be recognized, different allocation percentages may be selected based on the rankings.

EXAMPLES

For the purpose of an example of the determination of a Performance Value for an asset class, Table 1 provides example published index values for an asset class for a time period beginning at week 1:

TABLE 1

| Week | Index Value |
|------|-------------|
| 1    | 150.64      |
| 2    | 148.17      |
| 3    | 153.3       |
| 4    | 159.5       |
| 5    | 159.01      |
| 6    | 159.71      |
| 7    | 160.99      |
| 8    | 158.62      |
| 9    | 162.99      |
| 10   | 164.97      |
| 11   | 161.15      |
| 12   | 163.26      |
| 13   | 158.02      |
| 14   | 163.33      |

In accordance with a preferred embodiment of the invention, a Performance Value is calculated as follows:

$$PV(\%) = ((5A-12A)/12A) + (\text{Week 1-Week 14})/\text{Week 14})), \text{ where}$$

5A=SUM(Week 1:Week 5)*2.444
12A=SUM(Week 1:Week 12

Using the above index values:

$$5A = (163.33 + 158.02 + 163.26 + 161.15 + 164.97) \times 2.44 = 1981.424.$$

In a similar manner, 12A=1924.85.

$$\begin{aligned}\text{Thus,}\quad PV(\%) &= ((1981.424 - 1924.85)/1924.85) + \\ &\quad (163.33 - 150.64)/150.64) \\ &= 2.939\% + 8.424\% = 11.3632\%\end{aligned}$$

With reference now to FIGS. 3-5, there are shown examples of outputs achieved using the system and method of the invention to rank classes of assets based on Performance Values determined from published index values. For example, FIG. 3 is an example of an output generated by ranking the asset classes and allocating investment assets in accordance with the preferred valuation calculation and asset allocation percentages. As will be noted, the "Small Cap Funds" asset class had the highest performance value of 18.50% and was ranked number 1 and was allocated 30% of the assets.

FIG. 4 represents an example of an output generated for Oversold Conditions, wherein the Performance Value registers negative 15 percent (−15%) or less in the top equity group and the majority of all equity groups are negative. In this condition, the rankings are preferably reversed from the most negative to the positive (while maintaining 5% in Money Market Fund). As will be noted, the "Large Cap Growth Funds" asset group had the most negative Performance Value and was therefore ranked number 1 and was allocated 30% of the assets.

FIG. 5 represents an example of an output generated for Overbought Conditions wherein the Performance Value of the top equity asset class registers over twenty percent (20%) and the majority of the equity asset classes are positive. As noted above, allocations are not made to equity groups under Overbought Conditions and the asset groups are ranked in reverse order beginning with the least positive non-equity group, with the remainder of the allocation going to the Money market asset group.

In this case the Intermediate Corporate Bond asset group represents the non-equity asset group having the lowest performance value and receives the highest ranking. Since only two other non-equity asset groups exist, they receive the next allocations of 25% and 20%, and the remainder of the allocation (25%) is made to the Money Market asset group, since all of the other asset groups are equity groups.

The foregoing description of certain exemplary embodiments of the present invention has been provided for purposes of illustration only, and it is understood that numerous modifications or alterations may be made in and to the illustrated embodiments without departing from the spirit and scope of the invention as defined in the following claims.

What is claimed is:

1. A method for ranking and allocating investment assets, the method comprising the steps of:

classifying assets into discrete asset classes;

obtaining index values for each of the asset classes;

determining a performance value for each of the asset classes based on the index values for a starting time period and at least three subsequent time periods for each asset class, comprising determining a performance value based on the index values for a starting time period (Ts), a first time period (T1), a second time period (T2), and a third time period (T3), according to the formula:

$$PV(\%) = ((A-B)/B) + ((Vs-V3)/V3), \text{ where}$$

A=SUM(Vs:V1)*2.444

B=SUM(Vs:V2), and

Vs=a published index value for the starting time period (Ts)

V1=a published index value for the first time period T1

V2=a published index value for the second time period T2

V3=a published index value for the third time period T3;

comparing the performance value of each asset class to one another;

ranking the asset classes based on their performance values; and allocating the investment assets among the asset classes based on the ranking of the asset classes.

2. The method of claim 1, wherein the asset classes are selected from a group consisting essentially of stock, bond, and money market mutual funds.

3. A method for ranking and allocating investment assets, the method comprising the steps of:

classifying assets into discrete asset classes;

obtaining index values for each of the asset classes;

determining a performance value for each of the asset classes based on a 1 week index value total, a 5 week index value total and a 12 week index value total for each asset class in conjunction with an index value for a $14^{th}$ week, according to:

$$PV(\%) = ((5A-12A)/12A) + ((\text{Week 1-Week 14})/\text{Week 14}), \text{ where}$$

5A=SUM(Week 1:Week 5)*2.444

12A=SUM(Week 1:Week 12), and

Week 1=a published index value for week 1

Week 5=a published index value for week 5

Week 12=a published index value for week 12

Week 14=a published index value for week 14 comparing the performance value of each asset class to one another;

ranking the asset classes based on their performance values; and allocating the investment assets among the asset classes based on the ranking of the asset classes.

4. The method of claim 1, wherein the step of allocating the investment assets comprises allocating from about 20 to about 40 percent of the assets to the asset class a highest performance value.

5. The method of claim 1, wherein the step of allocating the investment assets comprises from about 20 to about 40 percent of the assets to an asset class having a lowest performance value in circumstances representing oversold conditions wherein a most negative performance value is less than about negative 15 percent in a top equity group and the performance values for a majority of all equity groups are negative.

6. The method of claim 1, wherein the step of allocating the investment assets comprises allocating from about 20 to about 40 percent of the assets to the asset class having a lowest performance value in circumstances representing overbought conditions wherein the performance value of the most positive equity asset class registers over about 20 percent and a majority of the performance values of the equity asset classes are positive.

7. A computer program stored on a computer readable medium for interacting with information corresponding to index values for asset classes for causing a computer to:

determine a performance value for each of the asset classes based on the index values for a starting time period and at least three subsequent time periods for each asset class; comprising a 1 week index value total, a 5 week index value total and a 12 week index value total for each asset class in conjunction with an index value for a $14^{th}$ week, according to:

$$PV(\%) = ((5A-12A)/12A) + ((\text{Week 1} - \text{Week 14})/\text{Week 14}), \text{ where}$$

5A=SUM(Week 1:Week 5)*2.444
12A=SUM(Week 1:Week 12), and
Week 1=a published index value for week 1
Week 5=a published index value for week 5
Week 12=a published index value for week 12
Week 14=a published index value for week 14:
compare the performance value of each asset class to one another;
rank the asset classes based on their performance values; and
allocate the investment assets among the asset classes based on the ranking of the asset classes.

* * * * *